(12) United States Patent
Calahan et al.

(10) Patent No.: US 8,743,730 B2
(45) Date of Patent: Jun. 3, 2014

(54) SYSTEMS AND METHODS FOR RECORDING RESOURCE ASSOCIATION FOR A COMMUNICATIONS ENVIRONMENT

(75) Inventors: Marc Calahan, Woodstock, GA (US); Jamie Richard Williams, Fleet (GB); Kenneth Richard Brodhagen, Roswell, GA (US); Damian Smith, Epsom (GB); Robert John Barnes, Watford (GB)

(73) Assignee: Verint Americas Inc., Alpharetta, GA (US)

( * ) Notice: Subject to any disclaimer, the term of this patent is extended or adjusted under 35 U.S.C. 154(b) by 1715 days.

(21) Appl. No.: 11/693,828

(22) Filed: Mar. 30, 2007

(65) Prior Publication Data

US 2008/0240126 A1    Oct. 2, 2008

(51) Int. Cl.
*H04M 1/65* (2006.01)
*H04L 12/50* (2006.01)
*H04L 12/26* (2006.01)

(52) U.S. Cl.
USPC .................. 370/254; 370/252; 370/401

(58) Field of Classification Search
None
See application file for complete search history.

(56) References Cited

U.S. PATENT DOCUMENTS

| | | | |
|---|---|---|---|
| 3,594,919 A | 7/1971 | De Bell et al. |
| 3,705,271 A | 12/1972 | De Bell et al. |
| 4,208,553 A | 6/1980 | Kaplan |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |

(Continued)

FOREIGN PATENT DOCUMENTS

| | | |
|---|---|---|
| EP | 0453128 A2 | 10/1991 |
| EP | 0773687 A2 | 5/1997 |

(Continued)

OTHER PUBLICATIONS

"Customer Spotlight: Navistar International," Web page, unverified print date of Apr. 1, 2002.

(Continued)

*Primary Examiner* — Marsha D Banks Harold
*Assistant Examiner* — Matthew Campbell
(74) *Attorney, Agent, or Firm* — Meunier Carlin & Curfman

(57) ABSTRACT

Included are embodiments for determining an extension-to-channel mapping. At least one embodiment includes determining, at a first time, a first extension-to-channel mapping configuration, the first extension-to-channel mapping configuration including an indication that at least one extension is coupled to a first recording channel. Similarly, some embodiments include determining, at a second time, a second extension-to-channel mapping configuration, the second extension-to-channel mapping configuration including an indication that the at least one extension is coupled to a second recording channel. Similarly, some embodiments include creating an extension-to-channel map, the extension-to-channel map indicating a configuration of the at least one extension, the first recording channel, and the second channel during a time period between the first time and the second time.

19 Claims, 13 Drawing Sheets

(56) References Cited

U.S. PATENT DOCUMENTS

| | | | |
|---|---|---|---|
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,875,400 A * | 2/1999 | Madhavapeddy et al. .... 455/458 |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,547 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 7,587,475 B2 * | 9/2009 | Koneru .................. 709/221 |
| 2001/0000962 A1 | 5/2001 | Rajan |
| 2001/0032335 A1 | 10/2001 | Jones |
| 2001/0043697 A1 | 11/2001 | Cox et al. |
| 2001/0055372 A1 * | 12/2001 | Glowny et al. ............ 379/88.22 |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2005/0232164 A1 * | 10/2005 | Anzaruoth et al. ............ 370/255 |

FOREIGN PATENT DOCUMENTS

| | | |
|---|---|---|
| EP | 0989720 | 3/2000 |
| EP | 1098500 A2 | 5/2001 |
| GB | 2369263 | 5/2002 |

(56) References Cited

FOREIGN PATENT DOCUMENTS

| WO | 97/10666 A1 | 3/1997 |
|---|---|---|
| WO | WO 98/43380 | 11/1998 |
| WO | WO 00/16207 | 3/2000 |

OTHER PUBLICATIONS

"DKSystems Integrates QM Perception with OnTrack for Training," Web page, unverified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"Price WaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of AI in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 ( © 2001).

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World Wide Web," pp. 1-12, Web page, unverified print date of Apr. 12, 2002.

E Learning Community, "Excellence in Practice Award: Electronic Learning Technologies,"*Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers,"*Emedia Professional* 10(8):6678 (Aug. 1997).

Fritz, "ToolBook II: Asymetrix's updated authoring software tackles the Web,"*Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of End-User Training Needs," *Communications ACM* 38(7):27-39 (Jul. 1995).

O'Herron, "CenterForce Technologies CenterForce Analyzer," Web page unverified print dateof Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," *Computer Education* 18(1-3):45-50 (1992).

PCT International Search Report, International Application No. PCT/US03/02541, mailed May 12, 2003.

(56) References Cited

OTHER PUBLICATIONS

Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for ContinuingEducation," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Building Customer Loyalty Through BusinessDriven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst, *It's Baa-aack. How Interative TV is Sneaking Into Your Living Room*, The AnchorDesk, May 10, 1999.
Berst, *Why Interactive TV Won't Turn You On (Yet)*, The AnchorDesk, Jul. 13, 1999.
Borland and Davis, *US West Plans Web Services on TV*, CNETNews.com, Nov. 22, 1999.
Brown, *Let PC Technology Be Your TV Guide*, PC Magazine, Jun. 7, 1999.
Brown, *Interactive TV: The Sequel*, NewMedia, Feb. 10, 1998.
Cline, Déjà vu—*Will Interactive TV Make It This Time Around?*, DevHead, Jul. 9, 1999.
Crouch, *TV Channels on the Web*, PC World, Sep. 15, 1999.
D'Amico, *Interactive TV Gets $99 set-top box*, IDG.net, Oct. 6, 1999.
Davis, *Satellite Systems Gear Up for Interactive TV Fight*, CNETNews.com, Sep. 30, 1999.
Diederich, *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger, *The Internet Meets the Couch Potato*, PCWorld, Oct. 1996.
*Hong Kong Comes First with Interactive TV*, Sci-Tech, Dec. 4, 1997.
*Interactive TV Overview TimeLine*, Interactive TV News.
*Interactive TV Wars Heat Up*, Industry Standard.
Needle, *Will the Net Kill Network TV?* PC World Online, Mar. 10, 1999.
Kane, *AOL-Tivo: You've Got Interactive TV*, ZDNN, Aug. 17, 1999.
Kay, *E-Mail in Your Kitchen*, PC World Online, 093/28/96.
Kenny, *TV Meets Internet*, PC World Online, Mar. 28, 1996.
Linderholm, *Avatar Debuts Home Theater PC*, PC World Online, Dec. 1, 1999.
Mendoza, *Order Pizza While You Watch*, ABCNews.com.
Moody, *WebTV: What the Big Deal?*, ABCNews.com.
Murdorf, et al., *Interactive Television—Is There Life After the Internet?*, Interactive TV News.
Needle, *PC, TV or Both?*, PC World Online.
*Interview with Steve Perlman*, CEO of Web-TV Networks, PC World Online.
Press, *Two Cultures, The Internet and Interactive TV*, Universite de Montreal.
Reuters, *Will TV Take Over Your PC?*, PC World Online.
Rohde, *Gates Touts Interactive TV*, InfoWorld, Oct. 14, 1999.
Ross, *Broadcasters Use TV Signals to Send Data*, PC World Oct. 1996.
Schlisserman, *Is Web TV a Lethal Weapon?*, PC World Online.
Stewart, *Interactive Television at Home: Television Meets the Internet*, Aug. 1998.
Swedlow, *Computer TV Shows: Ready for Prime Time?*, PC World Online.
Wilson, *U.S. West Revisits Interactive TV*, Interactive Week, Nov. 28, 1999.
Extended European Search Report, dated Oct. 24, 2012, received from the European Patent Office in connection with corresponding European Application No. 08251180.9.

\* cited by examiner

SYSTEMS AND METHODS FOR RECORDING RESOURCE ASSOCIATION FOR A COMMUNICATIONS ENVIRONMENT

TECHNICAL FIELD

This application is related to mapping of channels in a recording environment.

BACKGROUND

In many communications environments, customers desire to record communications. As the number of communications devices in a communications environment may be very large, a large number of recorders and/or recorder channels may be utilized to facilitate recording of this data. More specifically, in some environments, a recorder may be utilized that includes a plurality of recording channels. As various communications devices may be coupled to the recorder via these channels, the recorder may be configured to record data associated with communications with devices on these extensions. As the number of devices (and/or extensions) coupled to the recorder increases, mapping of the extensions to the recorder channel may become difficult. With incorrect extension-to-channel mapping, location of recordings may become difficult.

SUMMARY

Included are embodiments for determining an extension-to-channel mapping. At least one embodiment includes determining, at a first time, a first extension-to-channel mapping configuration, the first extension-to-channel mapping configuration including an indication that at least one extension is coupled to a first recording channel. Similarly, some embodiments include determining, at a second time, a second extension-to-channel mapping configuration, the second extension-to-channel mapping configuration including an indication that the at least one extension is coupled to a second recording channel. Similarly, some embodiments include creating an extension-to-channel map, the extension-to-channel map indicating a configuration of the at least one extension, the first recording channel, and the second channel during a time period between the first time and the second time.

Also included are embodiments of a system for determining a trunk channel to recording channel association. At least one embodiment includes a first determining component configured to determine, at a first time, a first extension-to-channel mapping configuration, the first extension-to-channel mapping configuration including an indication that at least one extension is coupled to a first recording channel. Also included is a second determining component configured to determine, at a second time, a second extension-to-channel mapping configuration, the second extension-to-channel mapping configuration including an indication that the at least one extension is coupled to a second recording channel. Some embodiments include a mapping component configured to create an extension-to-channel map, the extension-to-channel map indicating a configuration of the at least one extension, the first recording channel, and the second channel during a time period between the first time and the second time.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Included herein are embodiments that may be configured to facilitate mapping of extensions to channels and/or recorders. More specifically, in at least one exemplary embodiment, a recorder and/or other component may be configured to determine recording resource association (e.g., channel mapping) by sending a signal to an extension. Other embodiments may facilitate extension-to-channel association (and/or trunk channel-to-recording channel association and/or extension-to-recording resource association) by analyzing previously captured recording data to determine a current configuration.

Figure 1:
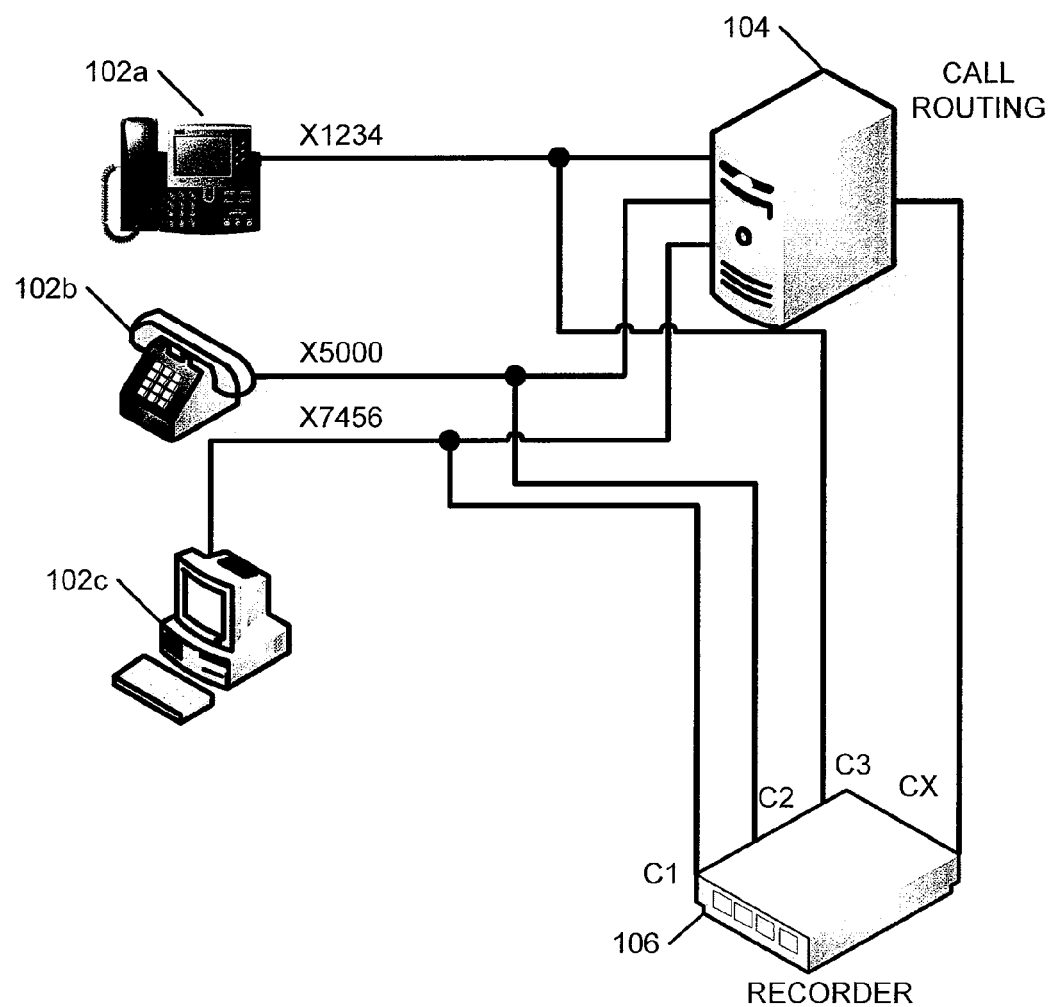
FIG. 1 is a diagram of an exemplary embodiment of a communications network illustrating a configuration for recording data and mapping extensions to channels.

Referring now to the drawings, FIG. 1 is a diagram of an exemplary embodiment of a communications network illustrating a configuration for recording data and mapping extensions to channels. As illustrated in the nonlimiting example of FIG. 1, communications devices 102*a*, 102*b*, and 102*c* (which may include a telephone, an Internet Protocol telephone, a personal computer, a Personal Digital Assistant, a communications trunk, etc.) may be coupled to a call routing component 104 (which may include a switch, call controller, and/or other components). More specifically, the call routing component 104 may be configured to facilitate communications among communications devices 102*a*, 102*b*, and 102*c* and/or with other communications devices. The call routing component may be configured to send substantive data (which may include voice data, screen data, etc.) and/or control data associated with the communication.

As communications devices 102*a*, 102*b*, and 102*c* may be associated with a common network, these communications devices 102 may be associated with an extension. The extension may be a local extension in a local network, or may be a global extension in a Public Switched Telephone Network (PSTN), Internet Protocol (IP) environment, cellular environment, and/or other Wide Area Network (WAN) configuration. More specifically, in at least one nonlimiting example, communications device 102*a* may be associated with the extension 1234. When a first user on a communications device (and/or other device) desires to contact a second user on the communications device 102*a*, the first user can dial the extension 1234 to be placed in contact with the communications device 102*a*.

Also included in the nonlimiting example of FIG. 1 is a recorder 106. The recorder 106 may be configured to record data communicated to and from communications devices 102. As illustrated in FIG. 1, the recorder 106 may be passively tapped to each of the lines between communications devices 102*a*, 102*b*, and 102*c* and call routing component 104. More specifically, the communications device 102*a* is coupled to channel 3 of the recorder 106. The communications device 102*b* is coupled to channel 2 of the recorder 106. The communications device 102*c* is coupled to channel 1 of the recorder 106.

As discussed above, as a plurality of extensions may be tapped for recording at the recorder 106, an accurate mapping of extensions to channels may become difficult. More specifically, in many current implementations, upon installation of the recorder 106, a technician may manually determine each extension to which the recorder channels are coupled. While this may become a tedious task for a technician, errors in this determination can cause loss of recorded data. Additionally, as maintenance and/or other changes to the network of FIG. 1 occur, the extensions may be moved and associated with different channels. As such, the mapping configuration that was previously determined may no longer be accurate. As such, in many current implementations, the technician may be forced to manually re-map the extension-to-channel connections.

While these current implementations utilize a manual mapping and re-mapping, embodiments of this disclosure may be configured for automatic mapping and/or re-mapping. More specifically, referring again to FIG. 1, the recorder 106 may include mapping logic (discussed in more detail below) for determining the extensions to which one or more of the channels of the recorder 106 are connected. Additionally, the recorder may utilize at least one of the recorder channels (CX, in this nonlimiting example) to facilitate utilization of the call routing component 104 in mapping and/or re-mapping an extension and channel.

As a nonlimiting example, the recorder may be configured to send a signal (via channel CX) to call one or more of the communications devices 102 to determine the channel to which these extensions are coupled. During operation of the communications devices 102*a*, 102*b*, and 102*c*, the recorder 106 can determine that the communications device 102*a* is currently not in use and/or has not been in use for a predetermined time period. Upon this determination, the recorder 106 can send a signal to the call routing component 104 to initiate a call to the communications device 102*a*. The recorder 106 can then determine which channels recorded data (or were otherwise active) during the time that the recorder 106 facilitated the call to the communications device 102*a*. If the recorder 106 determines that only one channel was active during this time, the recorder 106 can determine the channel to which the extension 1234 is coupled (in this nonlimiting example C1). If more than one channel was active during this time, additional calls may be facilitated by the recorder 106 to the communications device 102*a*. By analyzing data on the various calls, the recorder 106 can determine that the channels C1, C2, C3, in this nonlimiting example, are coupled to extensions 1234, 5000, and 7456, respectively.

Similarly, some embodiments may be configured such that the recorder 106 is configured to facilitate a call to an extension, such as extension 5000. Again, depending on the particular configuration, the recorder 106 can initiate the call and/or the call routing component 104 can initiate the call. Regardless, upon connecting with the communications device 102*b* at extension 5000, the recorder 106 can facilitate sending data to the communications device 102*b*. By sending data to the communications device 102*b*, the recorder 106 can record the sent data and store the sent data at a data storage component (not shown) or elsewhere). The recorder 106 can then compare the data sent with data received at the recorder 106. As the recorder 106 may be recording data from a plurality of extensions, the recorder 106 can compare the recorded data with the sent data until a match is found. Upon finding a match, the recorder 106 can map the extension from where the recording was received to the channel that captured the data.

One should note that a map, as disclosed herein may include a visual map and/or a non-visual map. Additionally, depending on the particular embodiment, the map may be stored at a recorder, at a call routing component, at a data storage component and/or elsewhere on the network. Additionally, when accessing a created map, a lookup table may be utilized to locate the desired data.

Similarly, some embodiments may be configured to facilitate the dialing of an extension and, upon connection with the communications device 102 at that extension, dialing a predetermined code for identifying the channel to which that extension is coupled. As a nonlimiting example, upon connecting with extension 7456, the recorder 106 can send the following code [55*7456*55]. This exemplary code may be utilized to indicate the beginning of the code, the extension number being dialed, and the end of the code. More specifically, [55*] may be a code that indicates that the recorder 106 is determining an extension-to-channel mapping. Additionally, [7456] may be utilized to indicate the extension that is dialed. Finally, in this nonlimiting example, [*55] may be used to indicate that the code is finished.

Thus, in operation, the recorder 106 can facilitate a communications session with the communications device 106*c*. Upon establishment of the communications session, the recorder can facilitate (via channel CX, for example) sending of the code [55*7456*55] to the communications device 106*c*. Because the recorder 106 is coupled to the communications path to the communications device 106*c*, the recorder 106 receives and records the code that was sent. The recorder 106 can then recognize that a mapping test is being performed by recognizing that the recorded code includes a sub-code of [55*]. The recorder 106 can then determine that the extension at this particular channel by determining that the sub-code [7456] was recorded after the sub-code [55*]. The recorder 106 can then determine that no other data is forthcoming in this code from the sub-code [*55]. From this information, the recorder 106 can determine the channel that is connected to that particular extension.

One should note that while in the description above, a particular code was sent to the extension, this code is a nonlimiting example, as any code may be utilized for determining the channel to which an extension is connected. Additionally, while the above nonlimiting examples discuss dialing information to determine an extension-to-channel mapping, some embodiments may be configured such that the recorder 106 can facilitate the playing and recording of sounds. The recorder 106 can then use recognition logic to match the sent sounds to the recorded sounds.

Additionally, while the nonlimiting examples described above illustrate a configuration where the recorder 106 is configured to facilitate initiation of a communication for mapping extensions to channels, this is not a requirement. More specifically, in at least one exemplary embodiment, the recorder 106 may be configured for automatic call detection to monitor communications and recordings of the communications devices 102. Data associated with the communications and recordings may be stored and used to determine an extension-to-channel mapping. More specifically, the recorder 106 may monitor start times for various communications and start times for various recordings. By comparing this data, the recorder 106 may be able to determine a probability associated with an extension-to-channel mapping. If the probability that a particular channel is coupled to a particular extension reaches a predetermined threshold, the recorder 106 can map this configuration.

While the above exemplary embodiment discloses using start times to determine an extension-to-channel mapping, this is also a nonlimiting example. More specifically, other data, such as call and recording duration, data communicated versus data recorded, end times of a communication and recording, as well as other data.

Additionally, one should note that in at least one exemplary embodiment, one or more of the communications devices 102 may be configured to send screen data to the recorder 106. The recorder 106 (and/or other component) may be configured to interpret one or more characteristics of the recorded screen data to determine the current mapping configuration.

Figure 2:
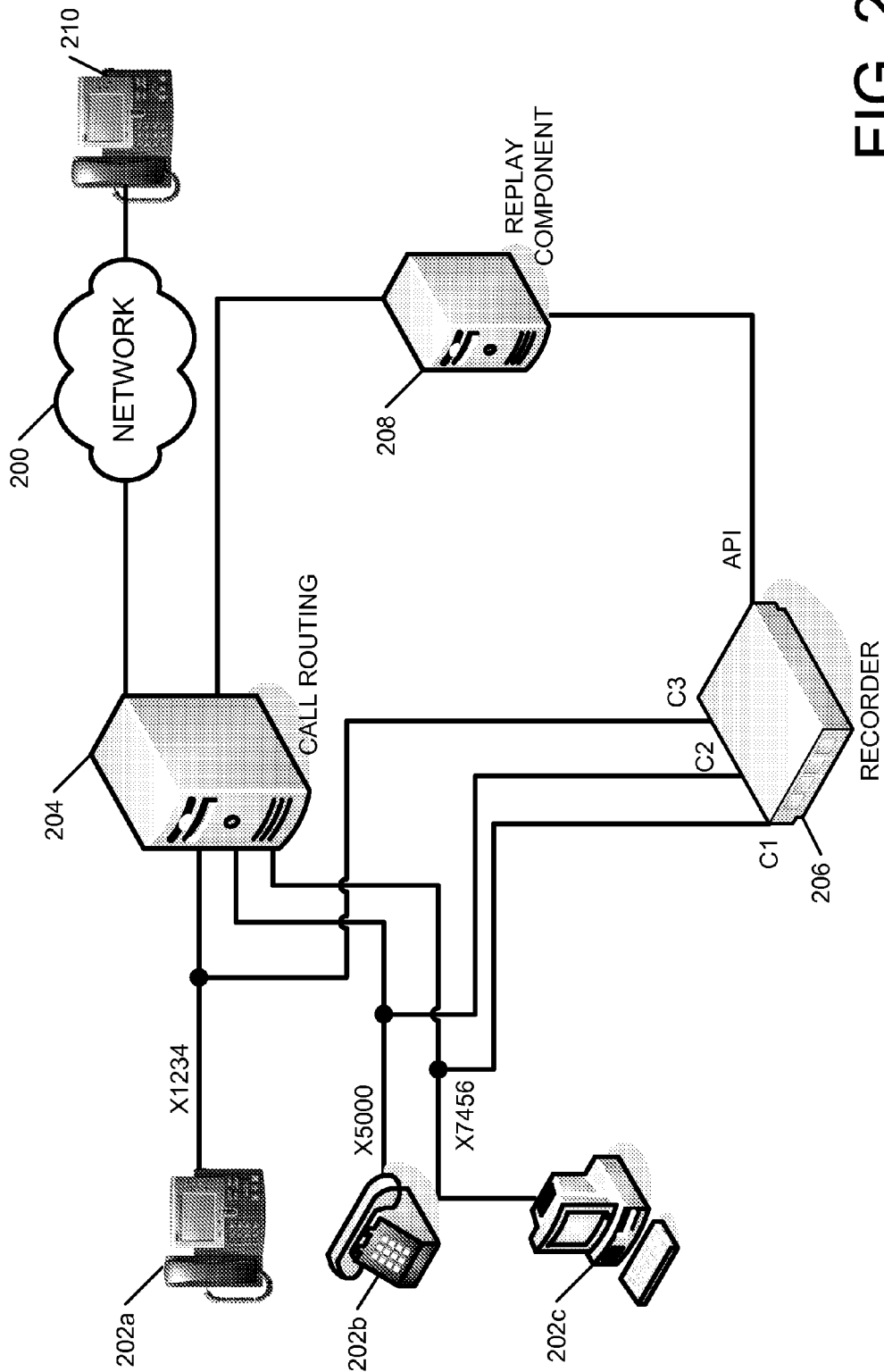
FIG. 2 is a diagram of an exemplary embodiment of a communications network illustrating utilization of a replay component in mapping extensions to channels, similar to the diagram from FIG. 1.

FIG. 2 is a diagram of an exemplary embodiment of a communications network illustrating utilization of a replay component in mapping extensions to channels, similar to the diagram from FIG. 1. As illustrated in the nonlimiting example of FIG. 2, communications devices 202*a*, 202*b*, and 202*c* are coupled to the call routing component 204, as discussed above. Additionally, a recorder 206 may be coupled to a line between the call routing component 104 and the communications devices 202 at a plurality of channels (C1, C2, and C3). As also illustrated, a communications device 210 may facilitate a communications session with any of the communications devices 202, via a network 200. The network 200 can include a PSTN, an IP network, a cellular network and/or other networks. Additionally, while illustrated as being separate from the network 200, the call routing component 204 may be, depending on the particular configuration, included with the network 200.

Also included in the nonlimiting example of FIG. 2 is a replay component 208. In this particular configuration, the replay component 208 may be configured to facilitate a determination of the channel and extension mapping. More specifically, the replay component 208 may be configured, in at least one embodiment, to initiate at least one communications request to the communications devices 202. The replay component 208 may also be configured to retrieve recording data from the recorder 206 (or at a data storage component, not shown) for determining the extension-to-channel mapping. More specifically, similar to embodiments discussed above, the replay component 208 may be configured to facilitate initiation of a communication, monitoring of all (or at least a portion) communications that are received at the recorder 208, and determine from the monitoring the channel that is associated with the dialed extension.

Similarly, in some embodiments, the replay component 208 may be configured to dial an extension to establish a communications session. When a communications session is established, the replay component 208 can send a signal for recording at the recorder 206. Once recorded, the replay component 208 can access the plurality of recordings captured by the recorder 206. As the recordings may be stored according to the channel from which they were received, the replay component 208 can compare the sent signal with the recorded data and determine the channel that corresponds with the extension that was dialed.

Also similar to embodiments discussed above, the replay component 208 may be configured to dial a predetermined code to determine an extension-to-channel mapping. More specifically, in at least one exemplary embodiment, upon establishing a communications session with a desired extension, the replay component may send the predetermined code to the extension, for recording by the recorder 206. Upon recording the data, the recorder may determine that the recorded data is associated with a channel mapping and send the channel and/or extension to the replay component 208. From this data, the replay component 208 may determine the extension-to-channel mapping.

One should note that while the exemplary embodiments discussed above include configurations where each extension is mapped to one channel, this is a nonlimiting example. More specifically, in at least one embodiment, an extension may be coupled to a plurality of channels and/or recorded by a plurality of recorders. In such a scenario, the at least one recorder 106, 206 may be configured to determine the extensions that are coupled to more than one channel. Additionally, in configurations where the plurality of channels span a plurality of recorders 106, 206, at least one of the recorders 106, 206 (and/or other components) may be configured to provide a mapping that includes this information. Similarly, in at least one exemplary embodiment, a plurality of extensions may be mapped to a single recorder and/or recorder channel.

Figure 3:
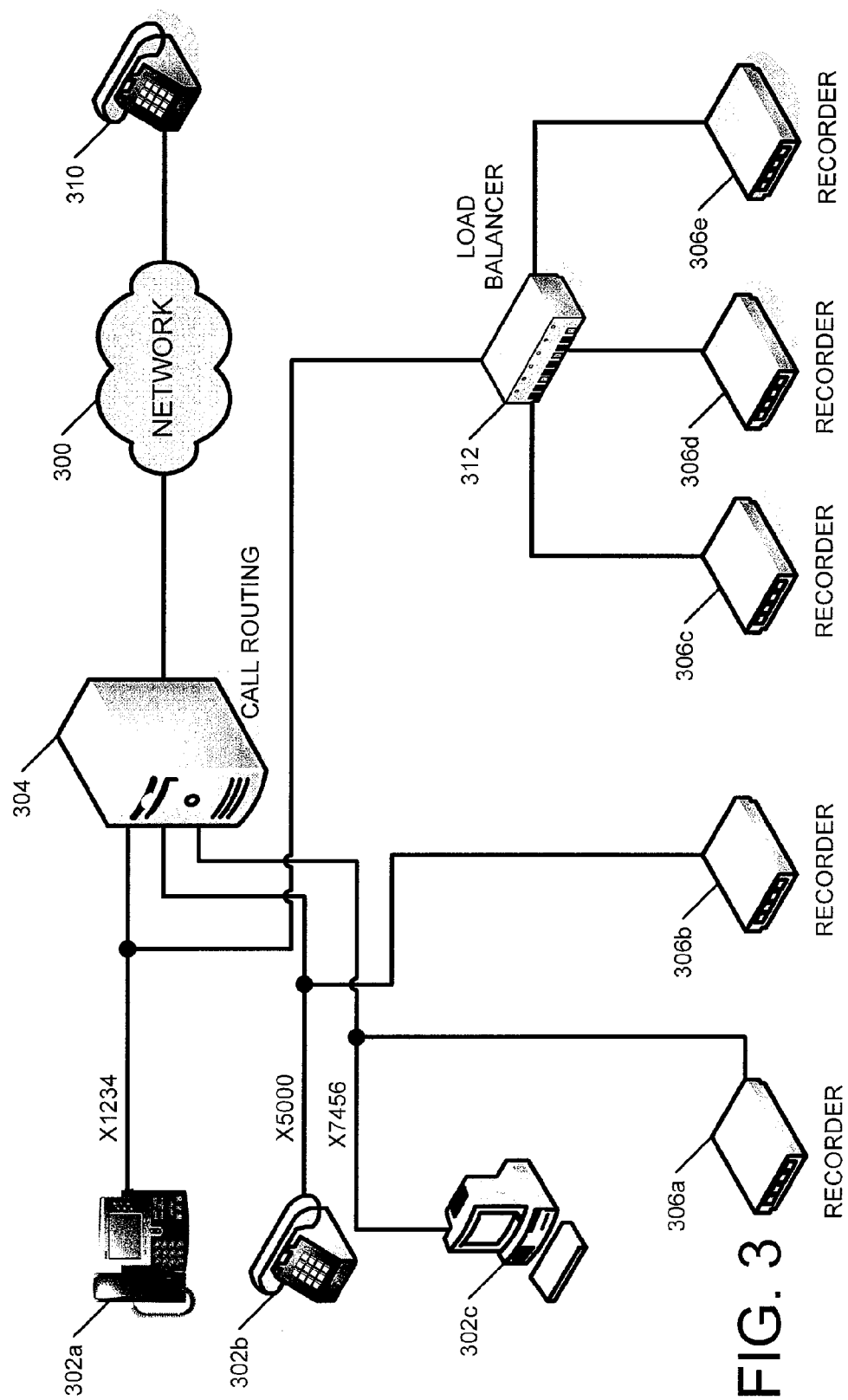
FIG. 3 is a diagram of an exemplary embodiment of an Internet Protocol (IP) network illustrating a configuration for recording data and mapping extensions to recorders.

FIG. 3 is a diagram of an exemplary embodiment of an Internet Protocol (IP) network illustrating a configuration for recording data and mapping extensions to recorders. As illustrated in the nonlimiting example of FIG. 3, communications devices 302a, 302b, and 302c may be coupled to a call routing component 304, which may be coupled to a network 300 and a communications device 310. While in the previous nonlimiting examples, a single recorder 106, 206 included a plurality of channels for recording a plurality of extensions, in this nonlimiting example, a plurality of recorders may be included to record a plurality 306 of lines.

More specifically, the recorder 306a may be coupled to an extension associated with the communications device 302c (e.g., 7456). The recorder 306b may be coupled to an extension associated with the communications device 102b (e.g., 5000). The recorders 306c, 306d, and 306e may be coupled, via a load balancer 312 to an extension associated with the communications device 102a (e.g., 1234).

In the exemplary embodiment of FIG. 3, one or more of the recorders 306 may be configured to facilitate an extension-to-channel mapping, as discussed above. Additionally, some embodiments may be configured such that one recorder 306 may be configured to perform one technique of extension-to-channel mapping and another recorder 306 may be configured to perform a different technique for extension to recorder mapping. Additionally, depending on the particular configuration, a recorder 306 and/or other component may be configured to store the determined extension-to-channel mapping.

One should note that while the IP network from FIG. 3 illustrates a configuration where one or more of the recorders are configured to determine an extension-to-channel (and/or recorder) mapping, this is a nonlimiting example, as another component (e.g., the load balancer 312, the call routing component 104, and/or other component not shown) may be configured to facilitate this mapping.

One should note that while the call routing component 304 is illustrated as a single component, the call routing component 304 may, depending on the particular configuration, represent a Service Switching Point (SSP), a Signal Transfer Point (STP), a call control server, and/or other components that facilitate a communications session.

One should also note that in addition to voice and control data, embodiments disclosed herein may be configured to record and/or utilize screen capture data to determine an extension-to-channel mapping. In at least one nonlimiting example, a recorder may be configured to determine whether the recorder can record screen capture data. Additionally, the call routing component 304 (and/or other network component) may be configured to create a list of recorders in the network that are capable of recording screen capture data. This information may be used to determine whether a communication is being received at a particular recorder.

Figure 4:
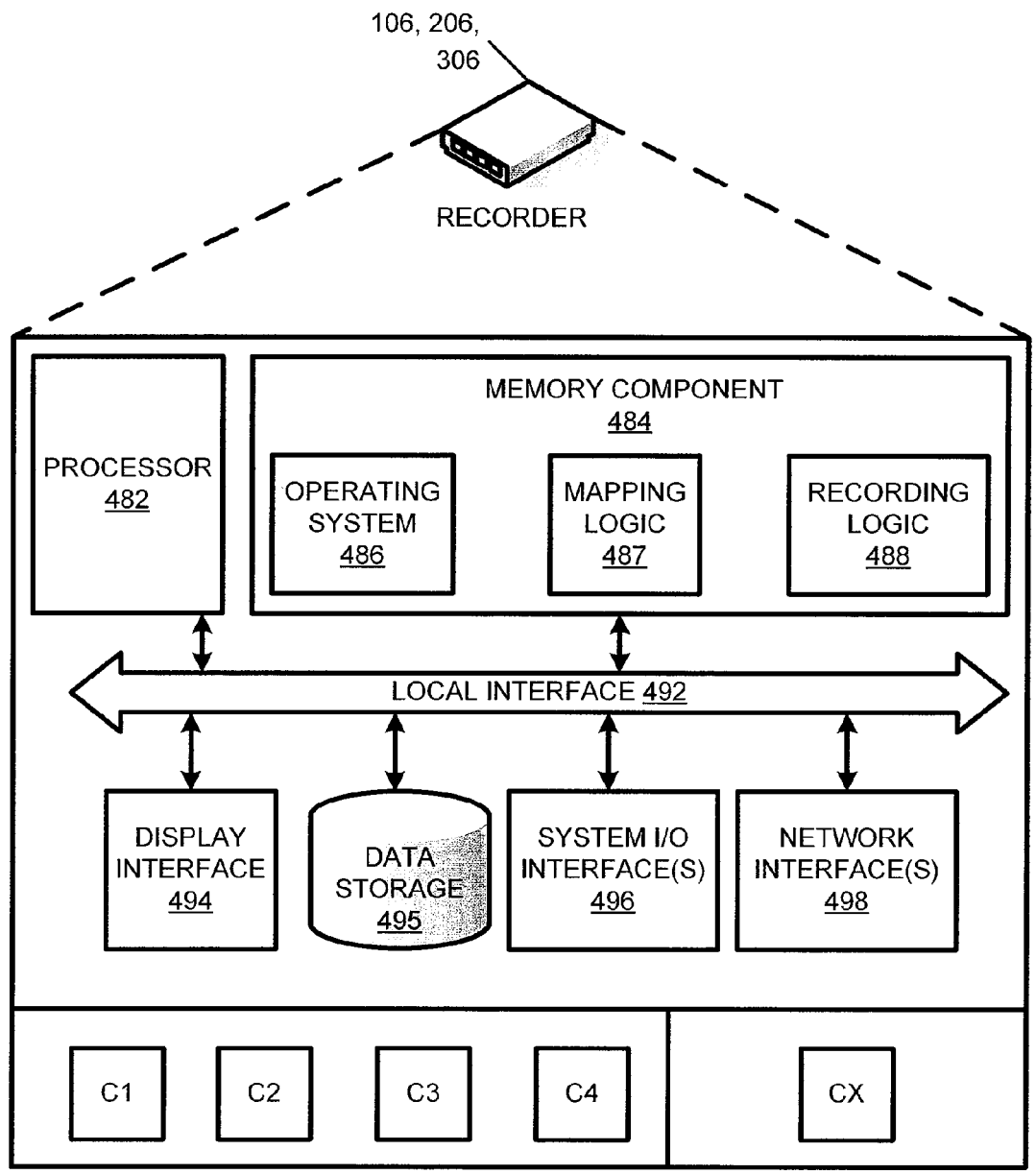
FIG. 4 is a diagram of an exemplary embodiment of a recorder, such as the recorder from FIGS. 1-3.

FIG. 4 is a diagram of an exemplary embodiment of a recorder, such as a recorder from FIGS. 1-3. Although a wire-line recorder 106, 206, 306 is illustrated, this discussion can be applied to wireless devices, as well. Generally, in terms of hardware architecture, as shown in FIG. 4, the recorder 106, 206, 306 may include a processor 482, a memory component 484 (which may include volatile and/or nonvolatile memory components), a display interface 494, a data storage component 495, one or more input and/or output (I/O) device interface(s) 496, and/or one or more network interface 498 that are communicatively coupled via a local interface 492. The local interface 492 can include, for example but not limited to, one or more buses or other wired or wireless connections. The local interface 492 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 482 may be a device for executing software, particularly software stored in the memory component 484.

The processor 482 can be any custom made or commercially available processor, a central processing unit (CPU), an auxiliary processor among several processors associated with the recorder 106, a semiconductor based microprocessor (in the form of a microchip or chip set), a macroprocessor, or generally any device for executing software instructions.

The memory component 484 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory component 484 may incorporate electronic, magnetic, optical, and/or other types of storage media. One should note that some embodiments of the memory component 484 can have a distributed architecture (where various components are situated remotely from one another), but can be accessed by the processor 482.

The software in memory component 484 may include one or more separate programs, each of which includes an ordered listing of executable instructions for implementing logical functions. In the example of FIG. 4, the software in the memory component 484 may include an operating system 486, mapping logic 487, and recording logic 488. The operating system 486 may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 484, so as to operate properly in connection with the operating system 486.

The Input/Output devices that may be coupled to system I/O Interface(s) 496 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a media duplication system, a router, etc.

Additionally included are one or more network interfaces 498 for facilitating communication with one or more other devices. More specifically, a network interface 498 may include any component configured to facilitate a connection with another device. While in some embodiments, among others, the recorder 106, 206, 306 can include a network interface 498 that includes a Personal Computer Memory Card International Association (PCMCIA) card (also abbreviated as "PC card") for receiving a wireless network card, however this is a nonlimiting example. Other configurations can include the communications hardware within the computing device, such that a wireless network card is unnecessary for communicating wirelessly. Similarly, other embodiments include network interfaces 498 for communicating via a wired connection. Such interfaces may be configured with Universal Serial Bus (USB) interfaces, serial ports, and/or other interfaces.

Additionally included are one or more channels C1, C2, C3, C4, and CX, which may be configured to facilitate recording of a communication. While the channels C1, C2, C3, C4, and CX may be coupled via the system I/O interface(s) 496 and/or the network interface(s) 498, this is not a requirement.

If recorder 106, 206, 306 includes a personal computer, workstation, or the like, the software in the memory component 484 may further include a basic input output system (BIOS) (omitted for simplicity). The BIOS is a set of software routines that initialize and test hardware at startup, start the operating system 486, and support the transfer of data among the hardware devices. The BIOS is stored in ROM so that the BIOS can be executed when the recorder 106, 206, 306 is activated.

When recorder 106, 206, 306 is in operation, the processor 482 may be configured to execute software stored within the memory component 484, to communicate data to and from the memory component 484, and to generally control operations of the recorder 106, 206, 306 pursuant to the software. Software in memory, in whole or in part, may be read by the processor 482, perhaps buffered within the processor 482, and then executed.

One should note that while the description with respect to FIG. 4 includes a recorder controller as a single component, this is a nonlimiting example. More specifically, in at least one embodiment, the recorder 106, 206, 306 can include a plurality of servers, personal computers, and/or other devices. Similarly, while the routing logic 487, the recording logic 488 and the presence logic 499 are each illustrated in FIG. 4 as single software components, this is also a nonlimiting example. In at least one embodiment, the presence logic 499 may include one or more components, embodied in software, hardware, and/or firmware. Similarly, routing logic and/or the recording logic 488 may include one or more logical components. Additionally, while the routing logic 487, the presence logic 499, and the recording logic 488 are depicted as residing on a single computing device, such as the recorder 106, 206, 306 may include one or more devices, the presence logic 499 may include one or more components residing on one or more different devices.

Similarly, while the discussion with regard to FIG. 4 refers to a recorder 106, 206, 306, the above description may be applied to other components discussed herein. More specifically, a call routing device 104, 204, 304, a communications device 102, 202, 302, a load balancer 312, a replay component 208, a recorder controller (not shown), a call control server (not shown), and/or other components may include similar elements and/or operate similarly.

Figure 5:
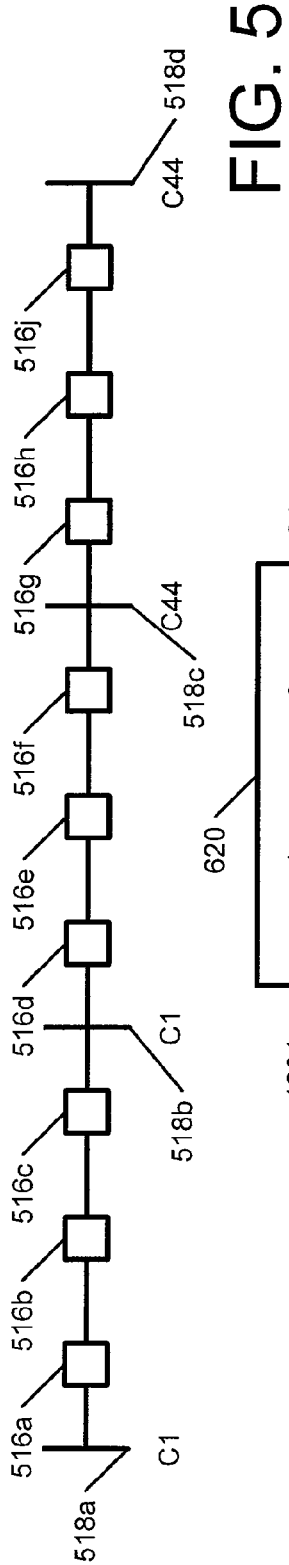
FIG. 5 is a diagram illustrating an exemplary embodiment of a plurality of recordings, such as recordings that may be captured in the networks from FIGS. 1-3.

FIG. 5 is a diagram illustrating an exemplary embodiment of a plurality of recordings, such as recordings that may be captured in the networks from FIGS. 1-3. As illustrated in the nonlimiting example of FIG. 5, a recorder 106, 206, 306 (referred to hereinafter as recorder 106) may be configured to record data from one or more communications sessions for an extension, the data recordings represented as recordings 516a-516j. Additionally illustrated in this nonlimiting example, an extension-to-channel mapping has been performed at vertical line 518a. During this mapping, the recorder 106, replay component 208, and/or other components may determine that this extension is currently sending recording data to channel 1 (C1). The recorder 106 may receive recordings 516a, 516b, and 516d before performing another mapping. At vertical line 518b, a mapping was performed and, again, it was determined that this extensions sends recording data to C1. The recorder 106 may then receive recordings 516d, 516e, and 516f before another mapping occurs. At vertical line 518c a mapping was performed that indicates that this extension is now sending data to C44. The recorder 106 may then receive recordings 516g, 516f, and 516j before another mapping is performed. At vertical line 518d, the mapping determined that this extension is sending data to C44.

While a determination can be made that the recordings 516a, 516b, and 516c were received a C1 and that recordings 516g, 516h, and 516j were received at C44, there may be some confusion regarding recordings 516d, 516e, and 516f. More specifically, while a determination may be made that these recordings were either received at C1 or C44, but depending on the particular configuration, a definitive determination may be unreachable as to exactly when the channel change occurred. In such a scenario, the mapping logic 487 may be configured to flag these recordings as being mapped to C1 or C44. Similarly, the mapping logic 487 may be configured to determine the appropriate mapping for these recordings using a different mapping technique, such as described above.

Figure 6:
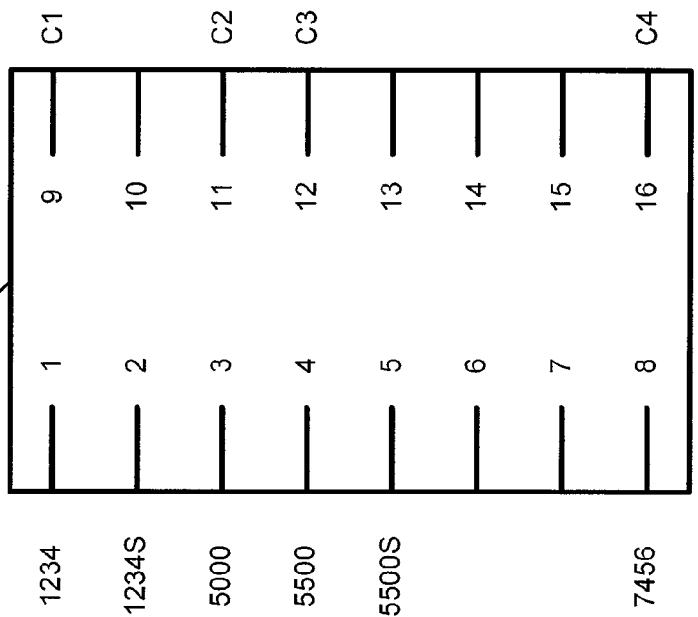
FIG. 6 is a diagram of an exemplary embodiment of a cable component that may be utilized in the networks from FIGS. 1-3.

FIG. 6 is a diagram of an exemplary embodiment of a cable component that may be utilized in the networks from FIGS. 1-3. As illustrated in the nonlimiting example of FIG. 6, a cable component 620 may be included with the call routing component 104, 204, 304 (referred to hereinafter as routing component 104). More specifically, the cable component 620 may be configured as an intermediary between a recorder 106 and an extension. Additionally, channels may be sequentially configured on the ports of the cable component 620. As shown in the nonlimiting example of FIG. 6, C1 is coupled to port 9 and is thus coupled to extension 1234, C2 is coupled to port 11 and is thus coupled to extension 5000, etc. Thus, upon a determination of one extension-to-channel mapping, the other channels of a recorder may be determined.

Figure 7:
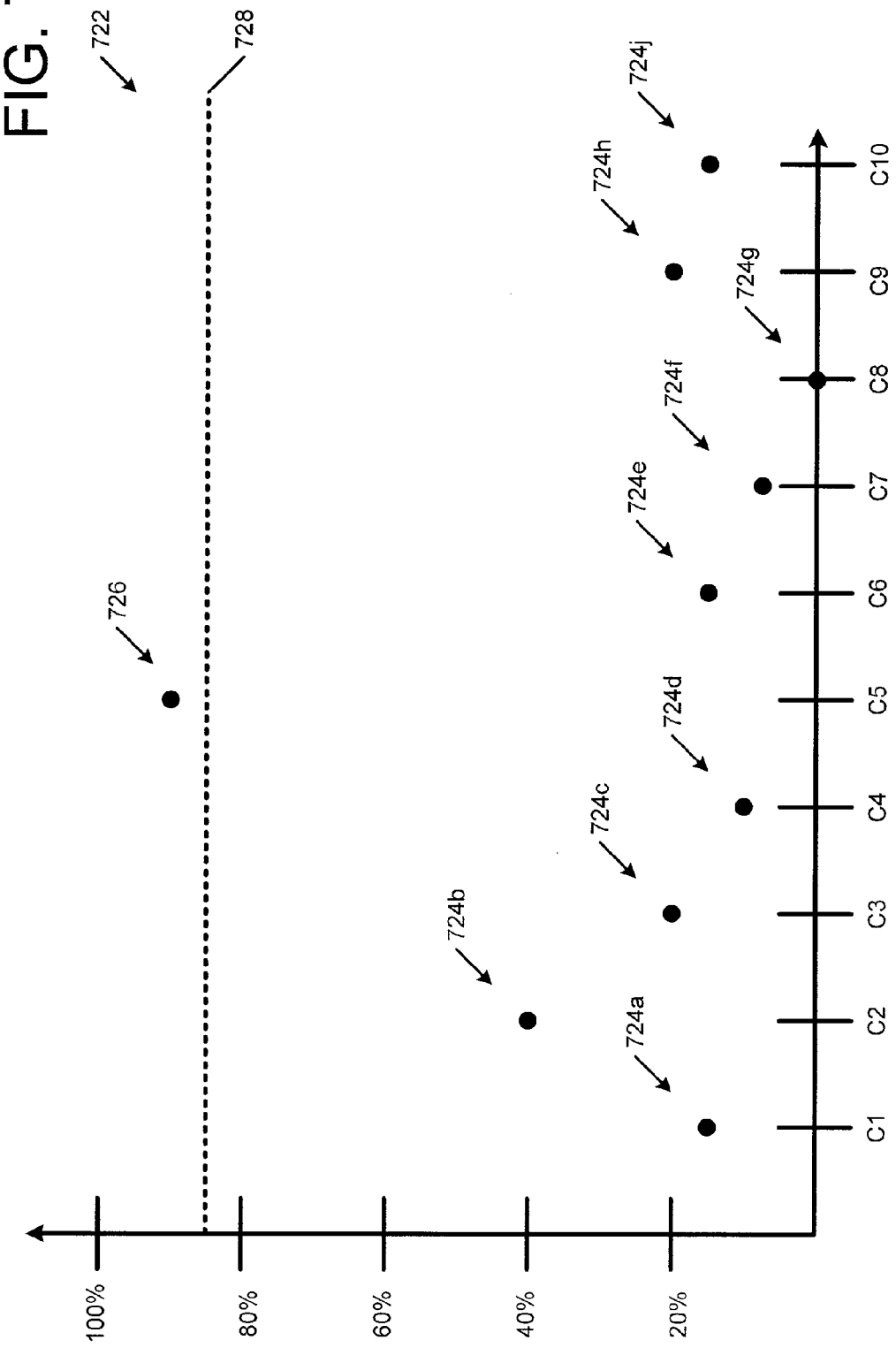
FIG. 7 is a diagram illustrating an exemplary embodiment of a graphical representation that may be utilized in determining an extension-to-channel mapping, such as in the networks from FIGS. 1-3.

FIG. 7 is a diagram illustrating an exemplary embodiment of a graphical representation that may be utilized in determining an extension-to-channel mapping, such as in the networks from FIGS. 1-3. As illustrated in the nonlimiting example of FIG. 7, an extension may be determined via automatic call detection, as described above. More specifically, a plurality of calls and recordings may be monitored to determine start time, end time, duration, midpoint, data communicated, etc. A comparison of the recorded data with the communication data may provide various probabilities related to the channels of a recorder 106. Additionally, the recording logic 487 may be configured to compare the probabilities against a predetermined threshold. If a channel exceeds the threshold, that channel may be mapped to the extension.

Referring to graph 772, channels C1-C4 (724a-724d) and C6-C10 (724f-724j) have been determined to have various probabilities for being coupled to this extension. Additionally, C5 726 has been determined to have a much higher probability of being coupled to this extension. As C5 726 exceeds the threshold 728, the recording logic 487 may determine that C5 is coupled to this extension, and map accordingly.

One should note that while the configuration of FIG. 7 may be determined based on the probability a channel is coupled to an extension, this is a nonlimiting example. More specifically, in at least one embodiment, the mapping logic 487 may be configured to use a process of elimination (determining which channels are not coupled to an extension) to conclude which channel is coupled to an extension. More specifically, in at least one exemplary embodiment, if the mapping logic 487 determines that at 12:00 on Jan. 1, 2007 no call was recorded from extension 1234 at channel C7, the mapping logic 478 can determine that C7 is not coupled to extension 1234. Similar data may be used to eliminate other channels and determine the appropriate mapping.

One should also note that while a threshold 726 of approximately 85% is illustrated in FIG. 7, this is also a nonlimiting example. More specifically, depending on the particular configuration, a user or other entity may determine an acceptable threshold 726. Similarly, in some embodiments, a threshold may be automatically set, based on the particular environment.

Figure 8:
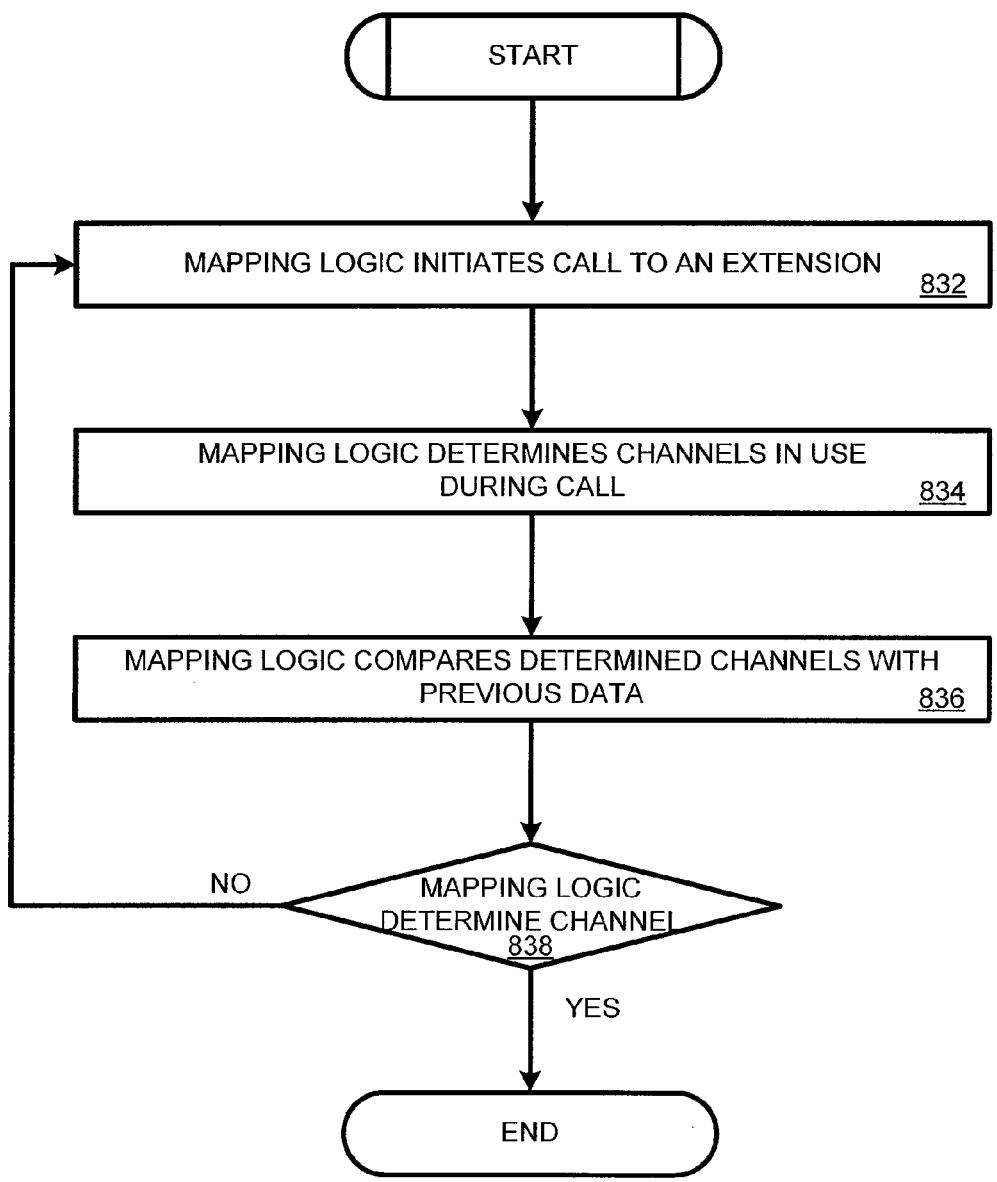
FIG. 8 is a flowchart illustrating an exemplary embodiment of a process that may be utilized in mapping an extension to a channel, such as in the networks from FIGS. 1-3.

FIG. 8 is a flowchart illustrating an exemplary embodiment of a process that may be utilized in mapping an extension to a channel, such as in the networks from FIGS. 1-3. As illustrated in the nonlimiting example of FIG. 8, the mapping logic 487 may initiate a call to an extension (block 832). The mapping logic 487 can determine the channels that are in use during the call (block 834). The mapping logic 487 can compare the determined channels with previously compiled data (block 836). As discussed above, the mapping logic 487 may be configured to make one or more calls and compare data associated with the time that the one or more calls were made. From this, the mapping logic 487 can determine the extension-to-channel mapping. A determination can then be made as to whether the channel mapping has been determined (block 838). If so, the process may end. If no channel mapping has been determined, the flowchart may return to block 832.

Figure 9:
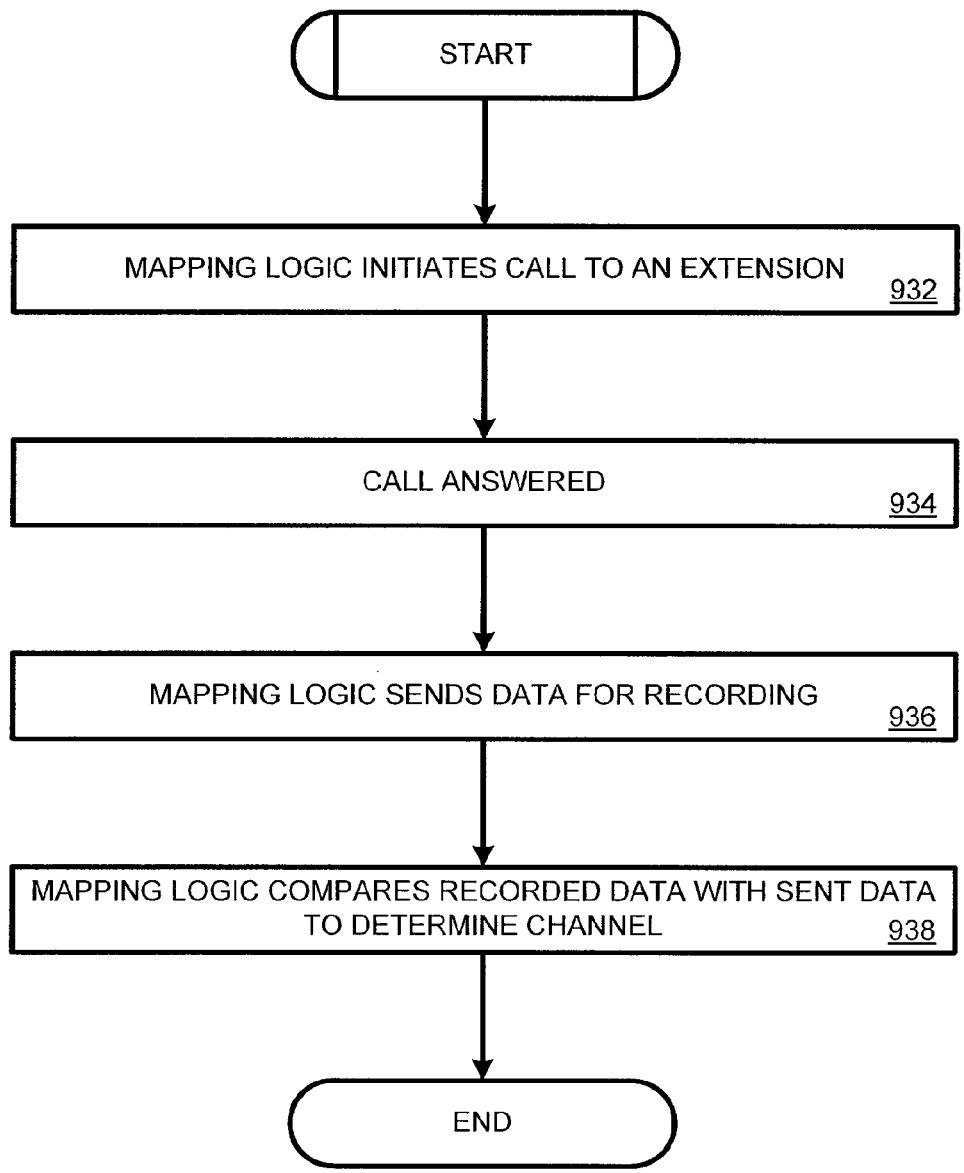
FIG. 9 is a flowchart illustrating an exemplary embodiment of a process that may be utilized in comparing recorded data in mapping an extension to a channel, similar the flowchart from FIG. 8.

FIG. 9 is a flowchart illustrating an exemplary embodiment of a process that may be utilized in comparing recorded data in mapping an extension to a channel, similar the flowchart from FIG. 8. As illustrated in the nonlimiting example of FIG. 9, the mapping logic 487 can initiate a call to an extension (block 932). The call may then be answered (block 934). One should note that the answering of the call may be initiated by the communications device 102 that is coupled to that extension and/or facilitated by a switch or other call routing component 104. The mapping logic 487 can send data to the extension for recording (block 936). The data can include tones or other sounds, embedded data, etc. The mapping logic can then compare the recorded data with the sent data to determine the channel (block 938).

More specifically, in at least one exemplary embodiment, the mapping logic can compare all data recorded by the recorder 106. Similarly, some embodiments can utilize characteristics associated with the sent data to more quickly determine the current mapping. The characteristics may include a time that data was sent, a size of data, and/or other characteristics.

Figure 10:
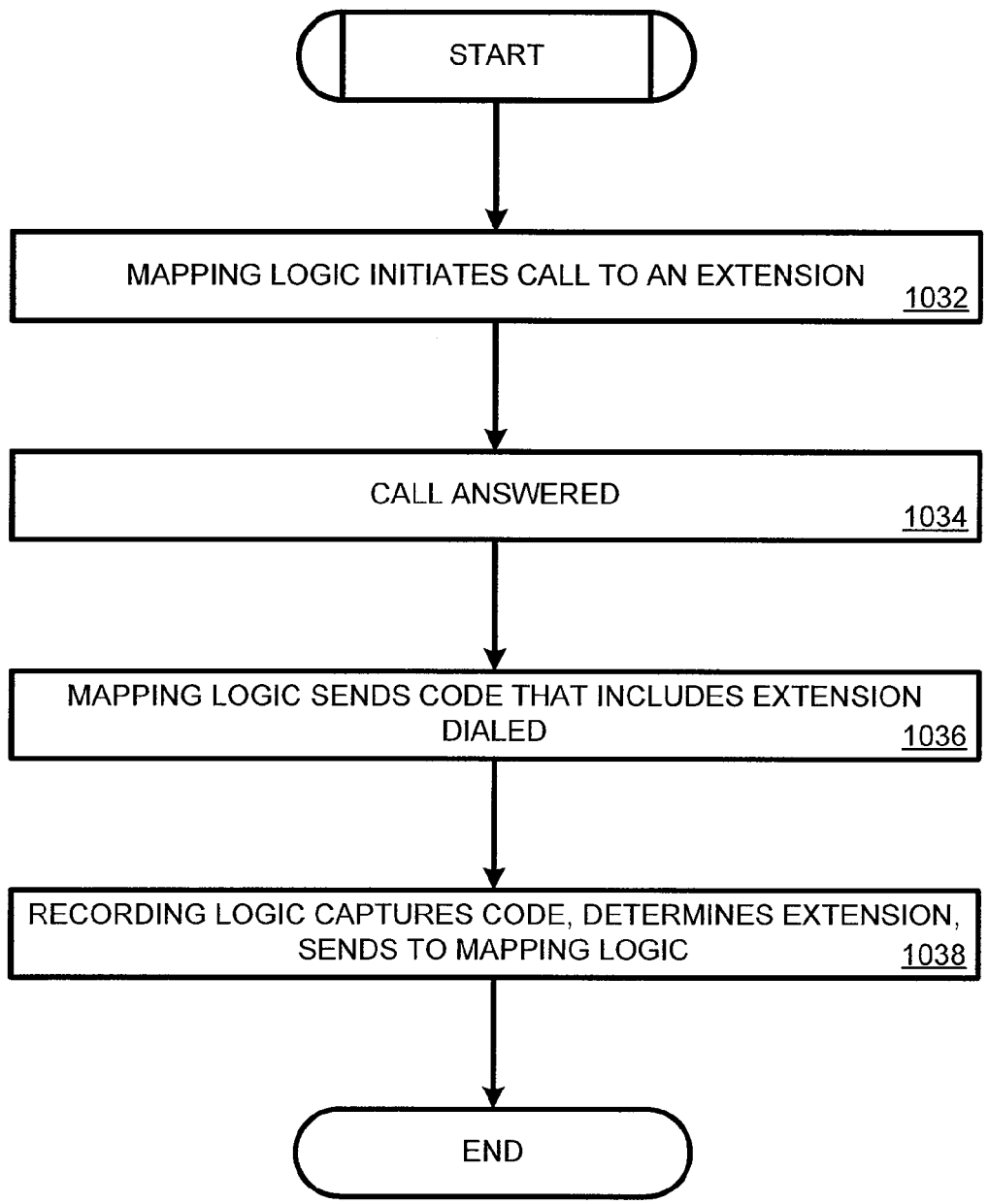
FIG. 10 is a flowchart illustrating an exemplary embodiment of a process that may be utilized for capturing a code in mapping an extension to a channel, similar to the flowchart from FIG. 9.

FIG. 10 is a flowchart illustrating an exemplary embodiment of a process that may be utilized for capturing a code in mapping an extension to a channel, similar to the flowchart from FIG. 9. As illustrated in the nonlimiting example of FIG. 10, the mapping logic 487 can initiate a call to an extension (block 1032). The call may then be answered (block 1034). The mapping logic 487 may send a code that includes the extension dialed (block 1036). As discussed above, the mapping logic 487 may send a code that is recognizable by the recording logic 488 as a mapping code. The recording logic 488 can capture the code, determine the extension from the code, and send the extension number from a channel that recorded the data to the mapping logic 487 (block 1038).

Figure 11:
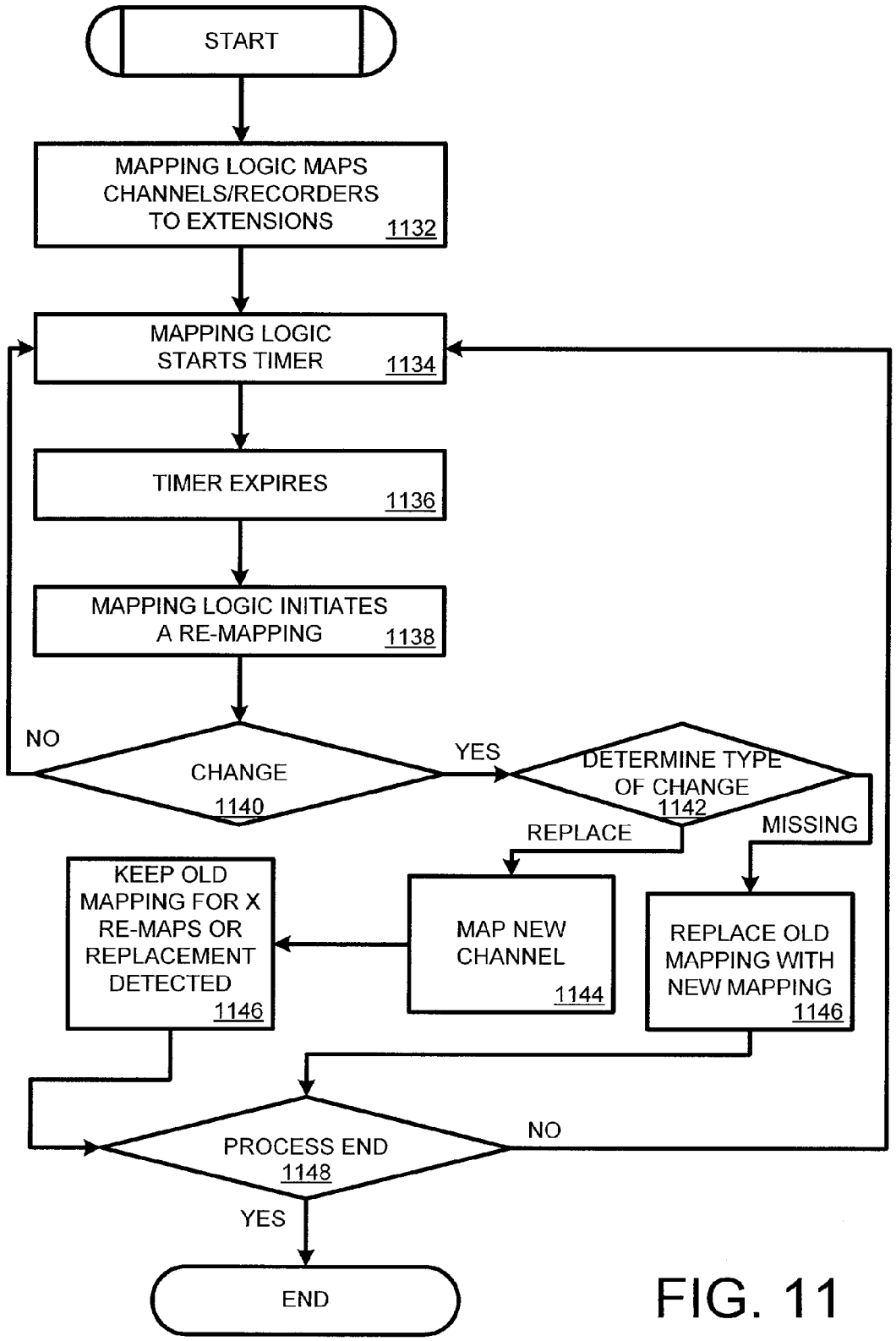
FIG. 11 is a flowchart illustrating an exemplary embodiment of a process that may be utilized for mapping a change in an extension-to-channel configuration, similar to the flowchart from FIG. 10.

FIG. 11 is a flowchart illustrating an exemplary embodiment of a process that may be utilized for mapping a change in an extension-to-channel configuration, similar to the flowchart from FIG. 10. As illustrated in the nonlimiting example of FIG. 11, the mapping logic 487 maps channels and/or recorders to extensions (block 1132). The mapping logic 487 can then start a timer (block 1134). The timer can expire (block 1136). Upon expiration of the timer, the mapping logic 487 can initiate re-mapping (block 1138). More specifically, as discussed above, the mapping logic 487 may be configured to map (and re-map) the extensions to channels on a periodic basis, on an aperiodic basis, on a continuous basis, at a user request, etc. One should note that while the description with regard to FIG. 11 refers to periodic re-mapping, this is a nonlimiting example.

After initiating re-mapping, the mapping logic can determine whether there has been a change in the current extension-to-channel map (block 1140). If there has not been a change in the mapping, the flowchart can return to setting the timer, at block 1134. If, on the other hand, a change is detected at block 1140, the mapping logic 487 can determine the type of change (block 1142). If the change includes a determination that a channel is no longer coupled to an extension (or vice versa), the mapping logic 487 can map the new channel (block 1144). The mapping logic 487 can keep the old mapping of this channel (and/or extension) for a predetermined number of re-maps or until a replacement is detected (block 1146).

More specifically, if the mapping logic 487 determines that a channel is no longer coupled to an extension, the mapping logic 487 (in at least one embodiment) may determine that a connection is loose or inadvertently lost and/or other temporary condition that will be resolved. As such, the mapping logic 487 may keep the previously determined map for this channel and/or extension for a predetermined time, predetermine number of re-maps, and/or for another duration.

If, at block 1142, the mapping logic 487 determines that there is a replacement change (e.g., a new extension is coupled to a channel, which replaces the previously determined extension), the mapping logic 487 can replace the old mapping with the new mapping. The mapping logic 487 can determine whether the process is ending (block 1148), and if not, the flowchart returns to block 1134 to start the timer.

Figure 12:
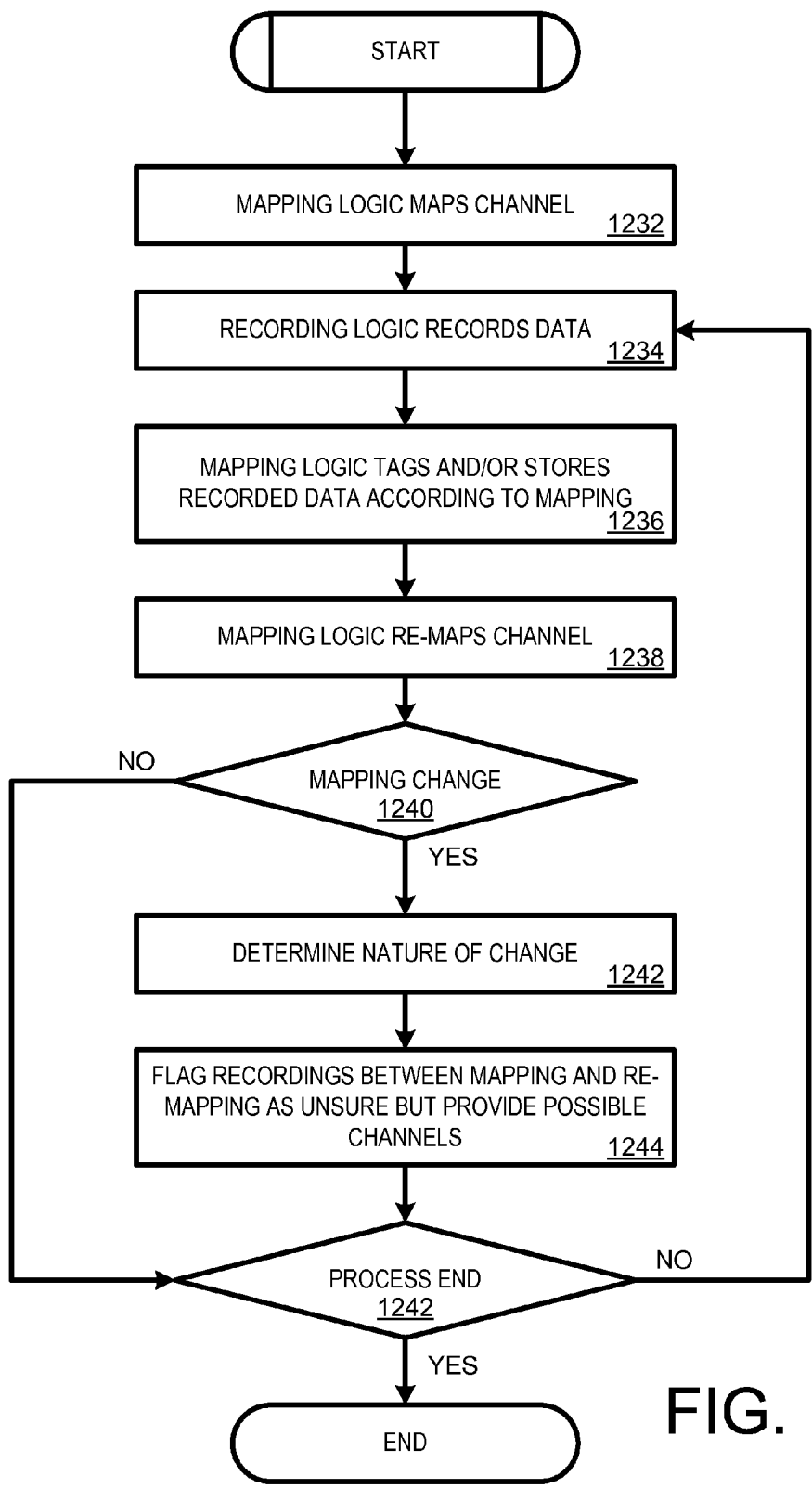
FIG. 12 is a flowchart illustrating an exemplary embodiment of a process that may be utilized in flagging a recording in response to a change in an extension-to-channel configuration.

FIG. 12 is a flowchart illustrating an exemplary embodiment of a process that may be utilized in flagging a recording in response to a change in an extension-to-channel configuration. As illustrated in the nonlimiting example of FIG. 12, the mapping logic 487 can map a channel (block 1232). The recording logic 488 can record data (block 1234). The mapping logic can then tag and store the recorded data according to the mapping (block 1236). More specifically, in at least one exemplary embodiment, upon determining a mapping, a recorder can record a communication at a channel. In addition to capturing data from the communication, the recording logic 488 (or mapping logic 487) can flag the recording with the appropriate extension. If the communication is an internal communication, the communication may be flagged with both (or all) extensions associated with the communication. The recording can then be stored according to the flagging.

One should note that in at least one exemplary embodiment, the recording may be stored as an audio file (e.g., .wav file, .mp3 file, etc.) and a description file (e.g., .xml file, .txt file, etc.) may be included with the audio file. The description file may include the extension and/or channel information. Similarly, some embodiments may include storing the recording (which may include the audio file and/or the description file) in a folder corresponding to the extension and/or channel from where the communication was received.

Referring back to FIG. 12, the mapping logic 487 can re-map the channel (block 1238). As discussed above, re-mapping can occur at any number of times. The mapping logic 487 can then determine whether there is a mapping change (block 1240). If there is not a mapping change, the mapping logic 487 can determine whether the process is ending (block 1242). If a change is detected, the mapping logic 487 can determine the nature of the change (block 1242). The mapping logic can flag recordings between mapping and re-mapping as unsure but provide possible channels (block 1244). More specifically, as discussed above, in at least one exemplary embodiment, if a change in the mappings occur, the mapping logic 487 may have uncertainty as to exactly when the change occurred and, thus, may have uncertainty regarding the source of one or more recordings. As such, the mapping logic 487 may be configured to flag one or more of these recordings with an uncertain flag, but indicate that the mapping may have originated from an extension in accordance with the previous map or with an extension in accordance with the new map. Other embodiments are also discussed to determine the source of these recordings. The mapping logic 487 can then determine whether the process can end (block 1242).

Figure 13:
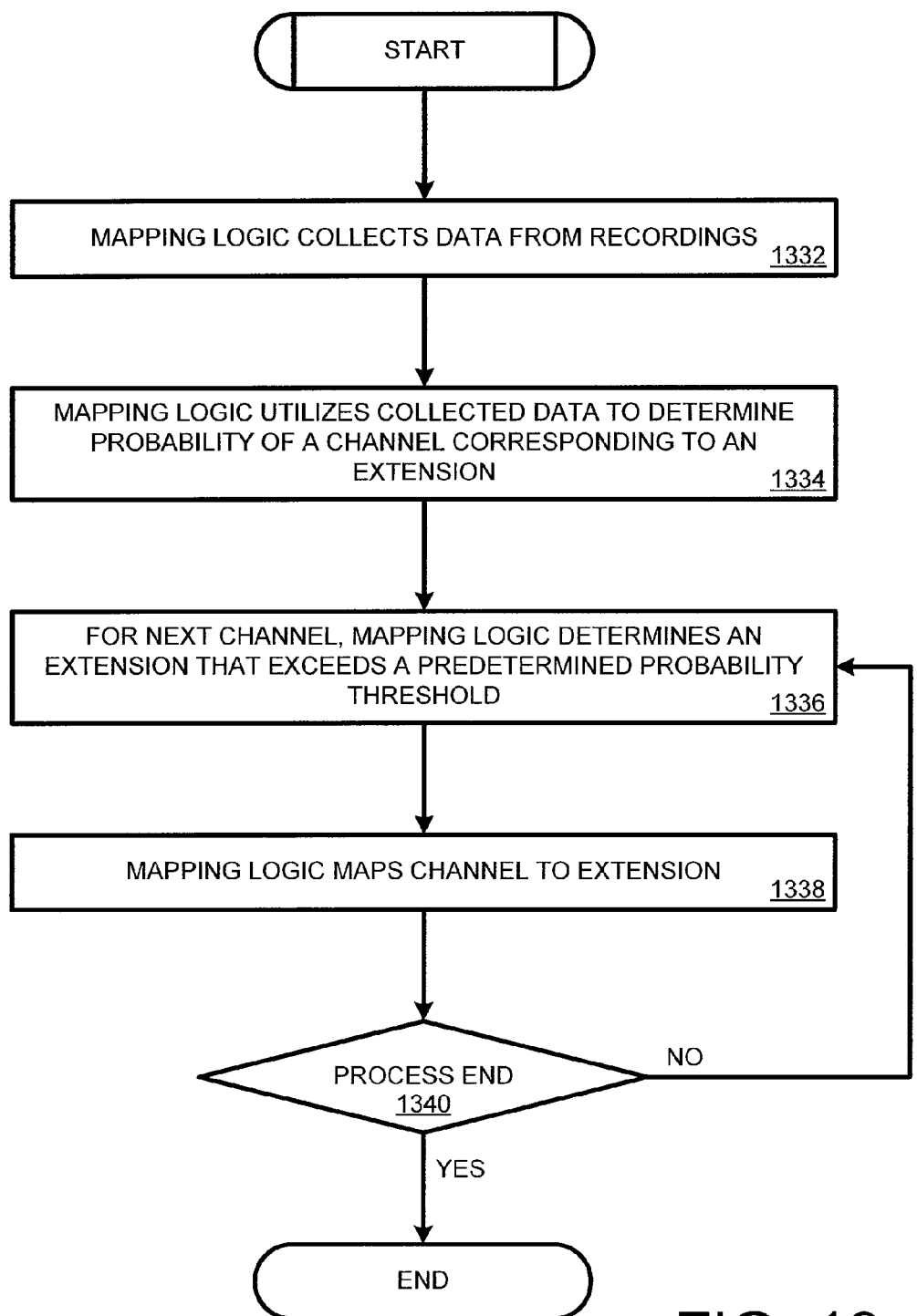
FIG. 13 is a flowchart illustrating an exemplary embodiment of a process that may be utilized for using call detection in mapping an extension to a channel, similar to the flowchart from FIG. 12.

FIG. 13 is a flowchart illustrating an exemplary embodiment of a process that may be utilized for using call detection in mapping an extension to a channel, similar to the flowchart from FIG. 12. As illustrated in the nonlimiting example of FIG. 13, the mapping logic 487 can collect data from recordings (block 1332). The mapping logic 487 can utilize collected data to determine a probability of a channel corresponding to an extension (block 1334). For the next channel, the mapping logic 487 can determine an extension that exceeds a predetermined probability threshold (block 1336). The mapping logic 487 can then map the channel to that extension (block 1338). A determination can be made whether the process can end (block 1340).

Figure 14:
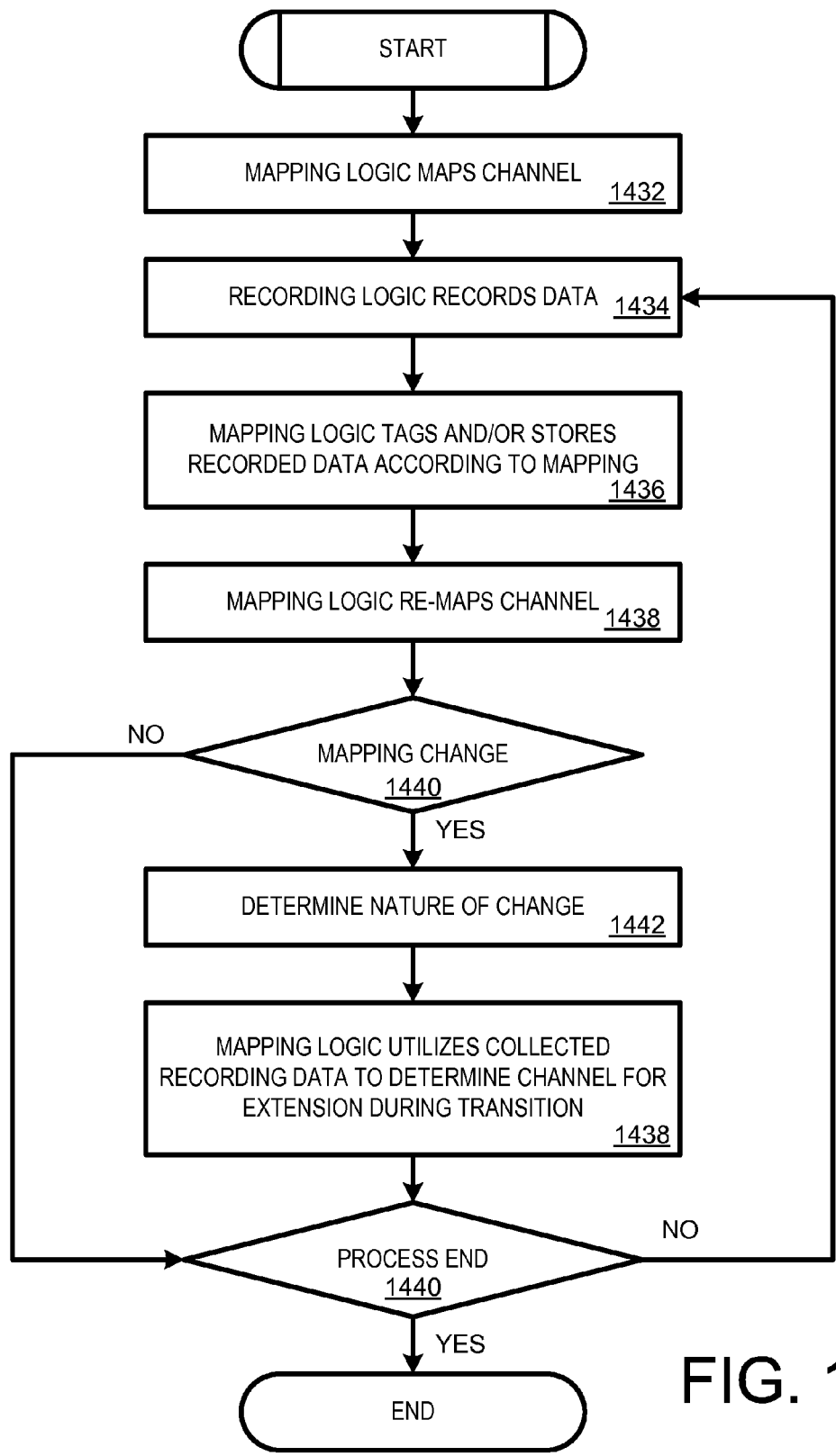
FIG. 14 is a flowchart illustrating an exemplary embodiment of a process that may be utilized in determining an extension-to-channel mapping, subsequent to a configuration change, similar to the flowchart from FIG. 13.

FIG. 14 is a flowchart illustrating an exemplary embodiment of a process that may be utilized in determining an extension-to-channel mapping, subsequent to a configuration change, similar to the flowchart from FIG. 13. As illustrated in the nonlimiting example of FIG. 14, the mapping logic 487 can map a channel (block 1432). The recording logic 488 can record data associated with a communication (block 1434). The mapping logic 487 can tag and/or store recorded data according to the mapping (block 1436). The mapping logic 487 can then re-map the channel (block 1438). The mapping logic 487 can then determine a mapping change (block 1440). If there is not mapping change, the process can proceed to block 1440. If, on the other hand, there is a mapping change, the mapping logic 487 can determine the nature of the change (block 1442). The mapping logic can then utilized collected recording data to determine a channel for the extension during the transition (block 1438). The mapping logic can then determine whether the process can end (block 1440). If not, the process can return to recording data (block 1434).

As discussed above, when a mapping change occurs, there may be uncertainty with regard to recordings that were received between the time of a previous mapping and the mapping change. As such, in at least one embodiment, the mapping logic 487 may be configured to utilize a plurality of mapping techniques for determining mapping for the uncertain recordings. While FIG. 14 illustrates utilization of the automatic call detection, described above, to determine mapping for the uncertain recordings, it will be appreciated that other techniques may also be utilized. As a nonlimiting example, in at least one exemplary embodiment, when a change occurs, a mapping algorithm may be utilized to work back in time to identify when the calls no longer match Computer Telephone Integration (CTI) data and deduct that this is when the change occurred. Other configurations may also be utilized.

It should be noted that a customer center may include, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

Additionally included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for determining an extension-to-channel association, comprising:
    providing a call routing component that facilitates communications between communication devices and a recorder, each of the communication devices being associated with an extension and the recorder being adapted to record the communication devices in accordance with an extension-to-channel mapping, wherein the recorder is configured to send a signal to call one or more of the communications devices to determine the channel to which these extensions are coupled, and further wherein the recorder sends a signal to the call routing component to initiate a call to the communications device, wherein the recorder can then determine which channels recorded data (or were otherwise active) during the time that the recorder facilitated the call to the communications device;
    determining, at a first time, a first extension-to-channel association configuration, the first extension-to-channel association configuration including an indication that at least one extension is coupled to a first recording channel;
    determining, at a second time, a second extension-to-channel association configuration, the second extension-to-channel association configuration including an indication that the at least one extension is coupled to a second recording channel;
    determining, from previously stored data, a first probability that the at least one extension is coupled to the first recording channel during the time period between the first time and the second time; and
    determining a change in the first extension to channel association configuration.

2. The method of claim 1, wherein the extension-to-channel mapping indicates a configuration of the at least one extension, the first recording channel, and the second channel during a time period between the first time and the second time.

3. The method of claim 2, wherein the map includes at least one of the following: a visual map stored at the recorder, a non-visual map stored at the recorder, a visual map stored at a server, and a non-visual map stored at a server.

4. The method of claim 1, wherein the extension-to-channel association indicates that the at least one extension is coupled to either the first recording channel or the second recording channel, during the time period between the first time and the second time.

5. The method of claim 1, further comprising determining, from previously stored data, a second probability that the at least one extension is coupled to the second recording channel during the time period between the first time and the second time.

6. The method of claim 1, further comprising determining whether the first probability exceeds a predetermined threshold.

7. The method of claim 1, further comprising recording data received from the at least one extension.

8. The method of claim 1, further comprising, in response to a determination that the first extension-to-channel association configuration is the same as the second extension-to-channel mapping configuration, utilizing the first extension-to-channel mapping configuration for the extension-to-channel map.

9. A system for determining a trunk channel to recording channel association, comprising:
    a call routing component that facilitates communications between communication devices and a recorder, each of the communication devices being associated with an extension and the recorder being adapted to record the communication devices in accordance with an extension-to-channel mapping, wherein the recorder is configured to send a signal to call one or more of the communications devices to determine the channel to which these extensions are coupled, and further wherein the recorder sends a signal to the call routing component to initiate a call to the communications device, wherein the recorder can then determine which channels recorded data (or were otherwise active) during the time that the recorder facilitated the call to the communications device;
    a first determining component configured to determine, at a first time, a first extension-to-channel mapping configuration, the first extension-to-channel mapping configuration including an indication that at least one extension is coupled to a first recording channel;

a second determining component configured to determine, at a second time, a second extension-to-channel mapping configuration, the second extension-to-channel mapping configuration including an indication that the at least one extension is coupled to a second recording channel;

a third determining component configured to determine, from previously stored data, a first probability that the at least one extension is coupled to the first recording channel during the time period between the first time and the second time; and a mapping component configured to create the extension-to-channel map, the extension-to-channel map indicating a configuration of the at least one extension, the first recording channel, and the second channel during a time period between the first time and the second time.

10. The system of claim 9, wherein the extension-to-channel map indicates that the at least one extension is coupled either the first recording channel or the second recording channel, during the time period between the first time and the second time.

11. The system of claim 9, further comprising a fourth determining component configured to determine, from previously stored data, a second probability that the at least one extension is coupled to the second recording channel during the time period between the first time and the second time.

12. The system of claim 9, further comprising a fifth determining component configured to determine whether the first probability exceeds a predetermined threshold.

13. The system of claim 9, further comprising a recording component configured to record data received from the at least one extension.

14. The system of claim 9, further comprising a utilizing component configured to utilize, in response to a determination that the first extension-to-channel mapping configuration is the same as the second extension-to-channel mapping configuration, the first extension-to-channel mapping configuration for the extension-to-channel map.

15. A system for determining an extension-to-recording resource association, comprising:

a call routing component that facilitates communications between communication devices and a recorder, each of the communication devices being associated with an extension and the recorder being adapted to record the communication devices in accordance with an extension-to-channel mapping, wherein the recorder is configured to send a signal to call one or more of the communications devices to determine the channel to which these extensions are coupled, and further wherein the recorder sends a signal to the call routing component to initiate a call to the communications device, wherein the recorder can then determine which channels recorded data (or were otherwise active) during the time that the recorder facilitated the call to the communications device;

a first determining component configured to determine, at a first time, a first extension-to-channel mapping configuration, the first extension-to-channel mapping configuration including an indication that at least one extension is coupled to a first recording channel;

a second determining component configured to determine, at a second time, a second extension-to-channel mapping configuration, the second extension-to-channel mapping configuration including an indication that the at least one extension is coupled to a second recording channel;

a third determining component configured to determine, from previously stored data, a first probability that the at least one extension is coupled to the first recording channel during the time period between the first time and the second time;

a mapping component configured to create the extension-to-channel map, the extension-to channel map indicating a configuration of the at least one extension, the first recording channel, and the second channel during a time period between the first time and the second time; and a recording component configured to record data received from the at least one extension.

16. The system of claim 15, wherein the extension-to-channel map indicates that the at least one extension is coupled to either the first recording channel or the second recording channel, during the time period between the first time and the second time.

17. The system of claim 15, further comprising a fourth determining component configured to determine, from previously stored data, a second probability that the at least one extension is coupled to the second recording channel during the time period between the first time and the second time.

18. The system of claim 15, further comprising means for determining whether the first probability exceeds a predetermined threshold.

19. The system of claim 15, further comprising a utilizing component configured to utilize, in response to a determination that the first extension-to-channel mapping configuration is the same as the second extension-to-channel mapping configuration, the first extension-to-channel mapping configuration for the extension-to-channel map.

* * * * *